US006550054B1

(12) United States Patent
Stefaniak

(10) Patent No.: US 6,550,054 B1
(45) Date of Patent: *Apr. 15, 2003

(54) METHOD FOR REPRESENTING TERMINAL-BASED APPLICATIONS IN THE UNIFIED MODELING LANGUAGE

(75) Inventor: Joseph Peter Stefaniak, San Clemente, CA (US)

(73) Assignee: Unisys Corporation, Blue Bell, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/441,116

(22) Filed: Nov. 17, 1999

(51) Int. Cl.$^7$ .............................. G06F 9/44; G06F 9/45
(52) U.S. Cl. ....................................... 717/104; 717/137
(58) Field of Search .................. 717/104, 100–103, 717/136–143, 105–109, 110–116, 120–123, 165–166; 707/103 R, 103 Y, 103, 103 Z, 500, 513, 523, 526–529; 703/25; 345/967

(56) References Cited

U.S. PATENT DOCUMENTS

| | | | | |
|---|---|---|---|---|
| 6,018,627 A | * | 1/2000 | Iyengar et al. | 717/103 |
| 6,038,393 A | * | 3/2000 | Iyengar et al. | 717/104 |
| 6,157,936 A | * | 12/2000 | Mutschler et al. | 707/513 |
| 6,167,563 A | * | 12/2000 | Fontana et al. | 707/103 Y |
| 6,223,180 B1 | * | 4/2001 | Moore et al. | 707/100 |
| 6,253,244 B1 | * | 6/2001 | Moore et al. | 709/203 |
| 6,289,501 B1 | * | 9/2001 | Mutschler, III | 717/114 |
| 6,343,265 B1 | * | 1/2002 | Glebov et al. | 703/25 |
| 6,349,404 B1 | * | 2/2002 | Moore et al. | 707/103 Y |

OTHER PUBLICATIONS

Lear. XML Seen as Integral to Application Integration. IT Pro. Oct. 1999. pp. 12–16.*
Petro et al. Model–Based Reuse Repositories—Concepts and Experience. IEEE. 1995. pp. 60–69.*

* cited by examiner

Primary Examiner—Gregory Morse
Assistant Examiner—Wei Zhen
(74) Attorney, Agent, or Firm—Phuong-Quan Hoang; Alfred W. Kozak; Mark T. Starr

(57) ABSTRACT

A computer-implemented method is disclosed for automatically converting text-based screen applications of a legacy computer system into a graphical-based representation thereof. The method includes the steps of transforming a terminal-based screen application into an application specification; converting the application specification into a modeling language-based representation; and, displaying the modeling language-based representation with a graphical user interface. The method of this invention also includes the capability of generating document type definitions of the modeling language-based representation, which enables transmission of the representation among modeling tools.

24 Claims, 12 Drawing Sheets

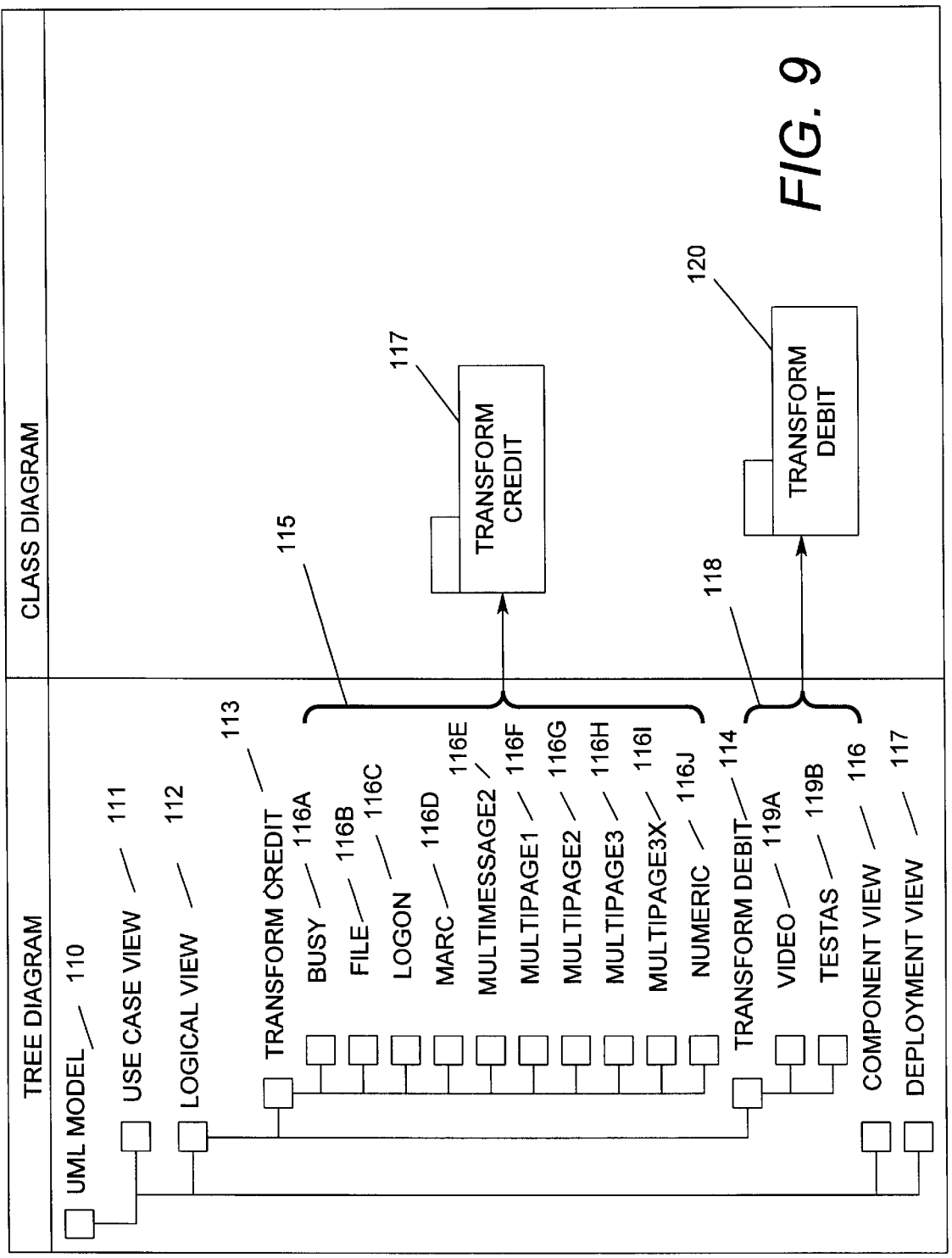

METHOD FOR REPRESENTING TERMINAL-BASED APPLICATIONS IN THE UNIFIED MODELING LANGUAGE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to computer programs and more specifically to a computer-implemented method for representing terminal-based applications in the Unified Modeling Language, which is useful in the development of business centric applications.

BACKGROUND OF THE INVENTION

Terminal-based computer applications have been the mainstay of many important industry segments. Legacy applications still play an important role in running some of the most complex and mission critical tasks in industries today. However, it is not possible with these legacy applications to view relationships and dependencies between the various terminal-based screens.

Accordingly, it would be desirable to have a method for capturing, representing and viewing—visually—terminal-based screens in modeling tools, which is independent of the modeling tool being used.

Moreover, it would be desirable to have a method for capturing and viewing terminal-based screen relationships and dependencies between legacy-based terminal applications useful in determining impact of change.

Also, it would be desirable to associate multiple terminal-based applications to a single project.

SUMMARY OF THE INVENTION

An object of the present invention is to provide a method for reading and interpreting terminal-based screen applications in order to generate extensible Markup Language Metadata Interchange (XMI) representation of the UML.

Another object of the present invention is to provide a method for capturing and recording screen relationships and dependencies.

Still another object of the present invention is to provide a method for associating multiple terminal-based applications to a single project.

A feature of the present invention is the ability to capture and record screen relationships and dependencies from a screen-based legacy application with a discovery tool.

Another feature of the present invention is the ability to associate one or many captured terminal-based applications into a single logical project.

These and other objects, which will become apparent as the invention is described in detail below, are provided in a computer-implemented method that automatically converts text-based screen applications of a legacy computer system into a graphical-based representation thereof. The method includes the steps of transforming a terminal-based screen application into an application specification; converting the application specification into a modeling language-based representation; and, displaying the modeling language-based representation with a graphical user interface. This method also includes the capability of generating document type definitions of the modeling language-based representation, which enables transmission of the representation among modeling tools.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIG. 9 is a diagram that illustrates a UML modeling tool user interface that graphically displays a legacy program by interpreting an XML file in accordance with the present invention.

DETAILED DESCRIPTION OF ONE EMBODIMENT

Figure 1:
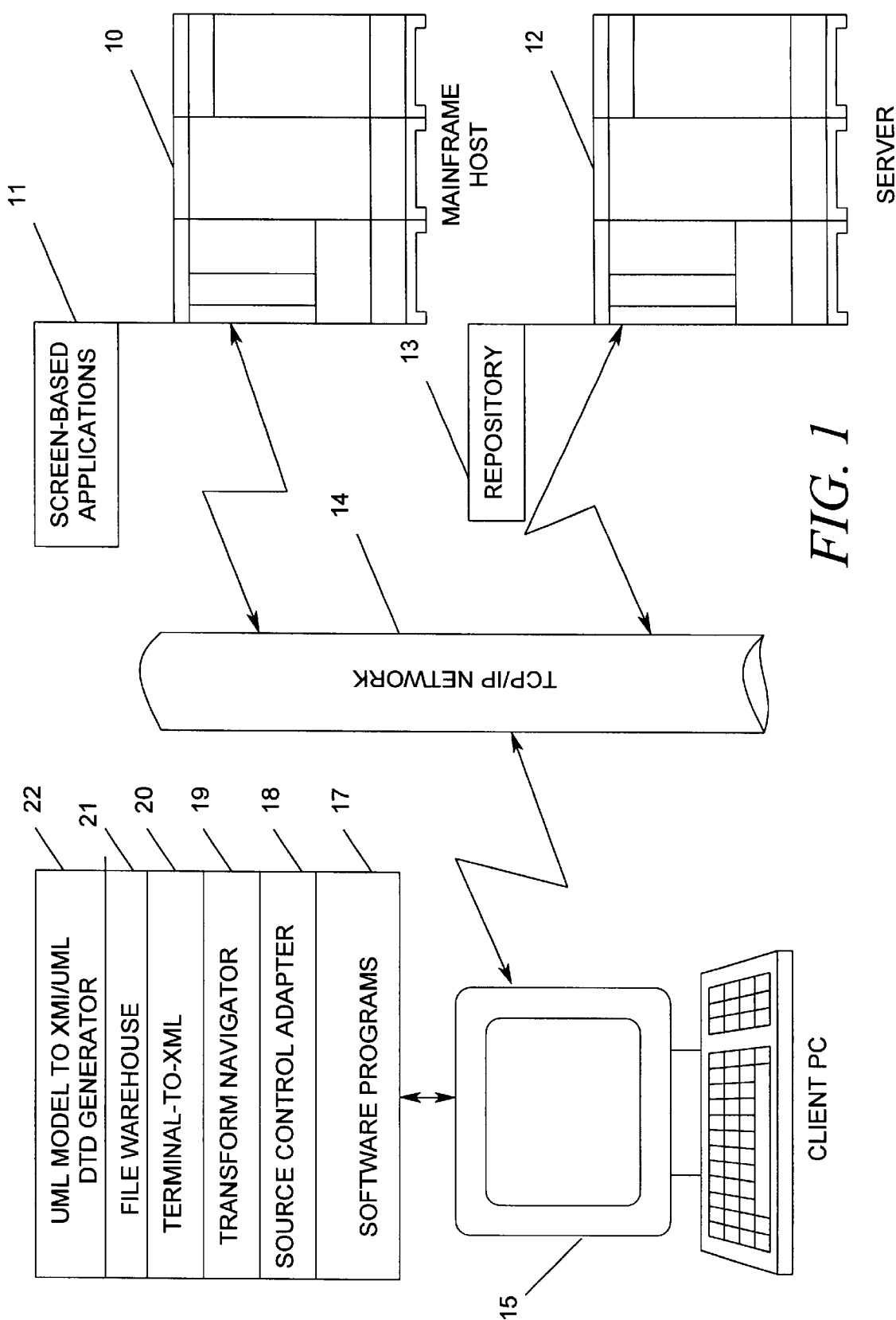
FIG. 1 is a block diagram of a computing system and network in which the present invention may be useful.

Before proceeding with a description of the system and method of the present invention, a summary of terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc.

Modeling the world as objects and then implementing them in an object-oriented system is the basis of object-oriented technology. Corporations are just beginning to apply the concepts of object technology to the business itself. Anything that is related to the finances, products, or customers of an enterprise can be a business object and work as part of a cooperative business object system. Business objects represent things, processes or events that are meaningful to the ongoing conduct of a business. Business objects make sense to business people. More specifically, a business object is a representation of an active thing in the business domain, including at least its business name and definition, attributes, behavior, relationships, rules, policies and constraints. Typical examples of business objects are an employee, a product, an invoice or payment receipt. Business objects do not have to be written in an object-oriented language.

An object represents the business object abstraction, which models the real world in the information system. Each such object in the information model is a component of that information model and must be supported by a technology infrastructure. The discovery phase is characterized by the capturing of source information. A unit of source information is characterized as containing enough information to allow it to be effectively modeled. Source information can include the screen input and output of legacy transactions, documents, data base records, etc.

Referring now to FIG. 1, a system configuration is illustrated, including a mainframe host 10 executing many computer programs, including screen-based applications 11. Also, a server 12 executes many programs, including a repository program 13. The mainframe 10 and the server 12 are coupled to a TCP/IP network 14, which in turn is coupled to a multiplicity of clients, such as a client PC 15. The PC 15 is capable of executing software programs 17 including a source control adapter 18, a transform navigator 19, a terminal-to-XML 20, a file warehouse 21 and an XML/UML model to XMI generator 22. The transform navigator 19 is amplified in greater detail in pending U.S. patent application Ser. No. 09/328,126, filed Jun. 8, 1999, and entitled A SYSTEM AND METHOD FOR DISCOVERING HOST-BASED APPLICATION ASSETS FOR THE DEVELOPMENT OF BUSINESS-CENTRIC SOFTWARE COMPONENTS, and assigned to the same assignee hereof. The file warehouse 20 is illustrated in greater detail in FIG. 4 hereof; the terminal-to-XML is amplified in FIGS. 5A through 5C hereof; and, the UML model to XMI/UML DTD generator is amplified in FIG. 6 hereof.

In the disclosed embodiment, the repository program 13 is a specialized, extensible object-oriented database application that adds value to a database system, which allows customization of a particular domain (such as application development).

The repository program 13 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, for TOOL-INDEPENDENT APPLICATION DEVELOPMENT; and, pending application Ser. No. 08/934,834, filed on Sep. 22, 1997, for EXCHANGING INFORMATION BETWEEN DIFFERENT OBJECT MODELS AND UML; each of which are hereby incorporated by reference as if set forth in full herein.

Figure 2:
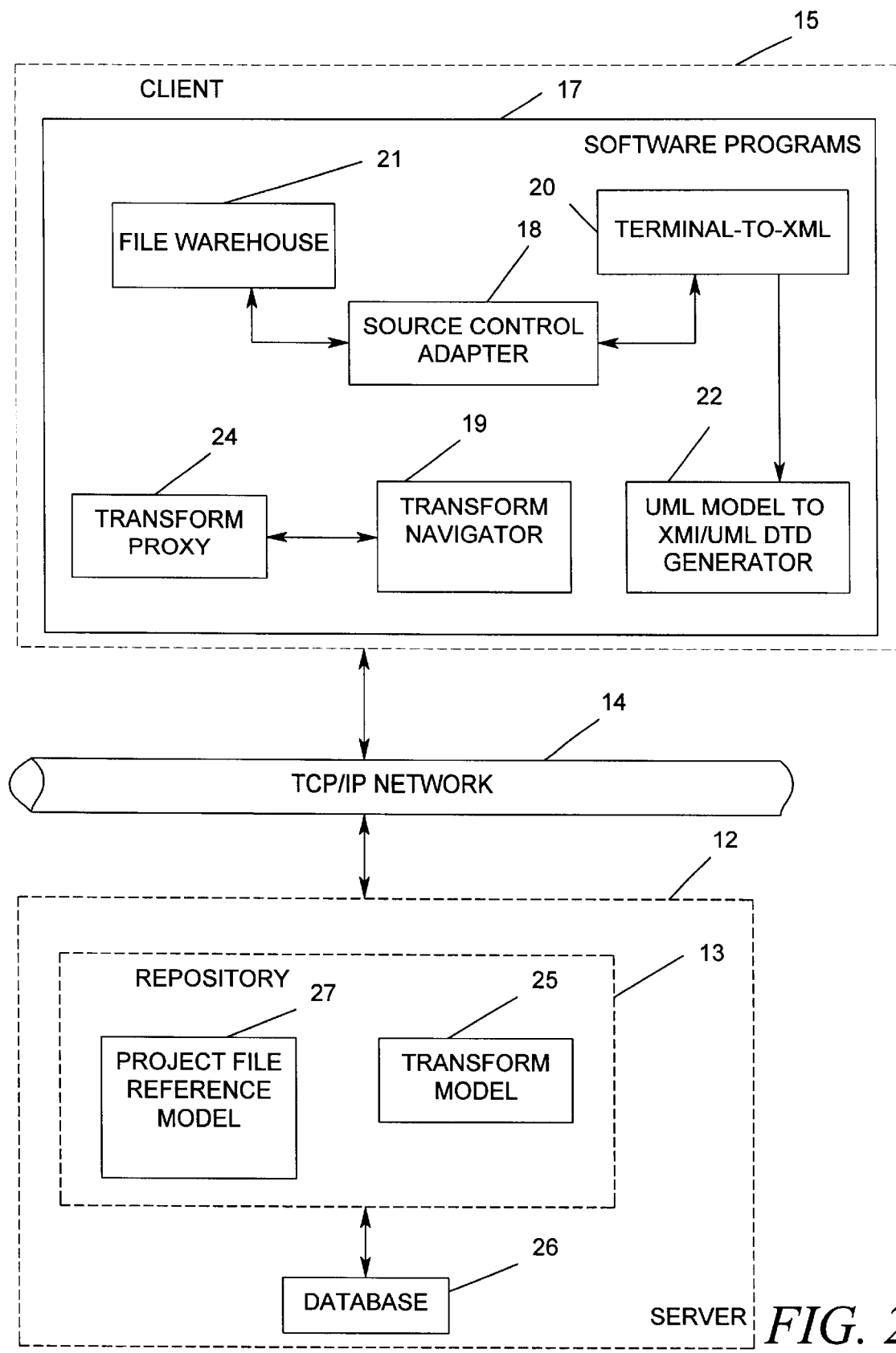
FIG. 2 is a block diagram of the software modules of the present invention.

Referring now to FIG. 2, a software module block diagram of the method and system of the present invention is shown. Various modules used for building and transforming screens on a host application into software components useful in developing business-centric applications are illustrated. Within the PC, or client, 15 is a terminal-to-XML converter module 20 that converts specifications of legacy screens into a UML compliant model where the legacy application is represented by a UML package, the screens are represented by UML classes and the fields in the screen are represented by UML attributes. The file warehouse module 21 provides a means for selecting the screen specifications from the transform model 25 in the repository 13 and forming a file reference model 27, also stored in the repository 13. The source control adapter 18 allows the terminal-to-XML, and the file warehouse module 21 to interface with the repository 13. A UML model to XMI/UML DTD generator module 22 generates the corresponding XMI representation for the UML model of the screen application generated by the terminal-to-XML converter. The transform proxy 24 is a COM compliant component that provides the capability for accessing the transform navigator 19. The transform proxy 24 communicates directly with the TCP/IP network 14, which in turn communicates directly with a transform model 25 within the repository program 13 that is being executed by the server 12.

A database 26 is accessible by the repository 13 for the storage and retrieval of host-based legacy data specifications. A typical database satisfactory for the database 26 is OSMOS, which is an object-oriented/relational database available from the assignee hereof. A project file reference model 27 contains references to classes included in the project. More will be discussed about the project file reference model in the discussion associated with FIG. 4.

Figure 3:
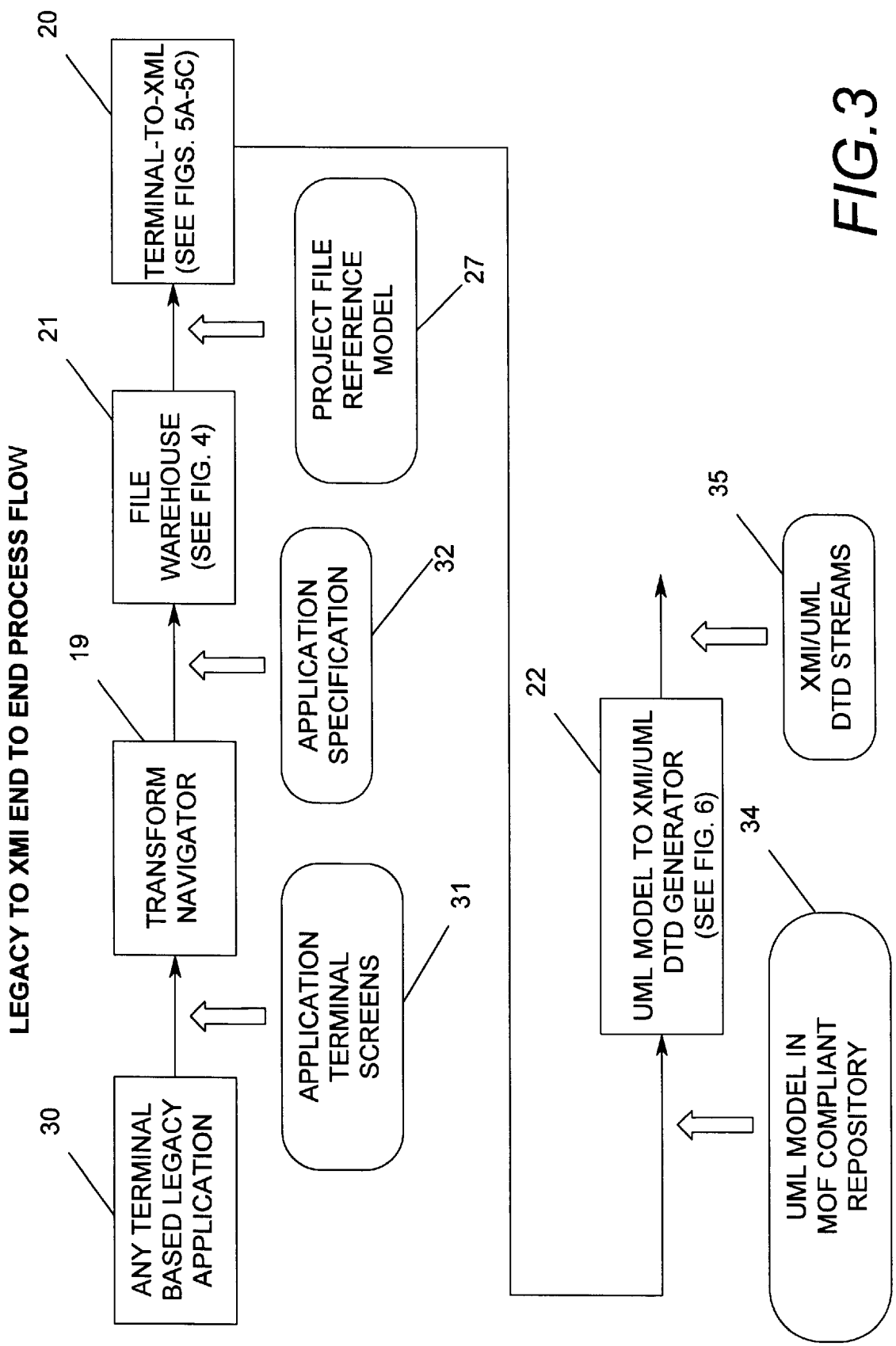
FIG. 3 is a diagram that shows an end to end process flow from a legacy program to a UML model.

Referring now to FIG. 3, a diagram that shows an end-to-end process flow from a legacy program to an XML/UML file is shown. The process flow begins with any terminal based legacy application 30, which produces application terminal screens 31. The terminal screens are discovered using the transform navigator 19, which produces application and screen specifications 32. The application and screen specifications 32 are then applied to the file warehouse 21, which produces the project file reference model 27. The model 27 is applied to the terminal-to-XML 20, which produces a UML model 34 in a MOF compliant repository. The UML model is then applied to the UML model to XMI/UML DTD generator 22, which produces XMI/UML DTD streams 35. The streams 35 may be used for several purposes, including transmitting legacy screen based application specifications over a network to modeling tools. From the modeling tools the application specifications could be viewed in an object oriented way compliant with the UML standard.

Figure 4:
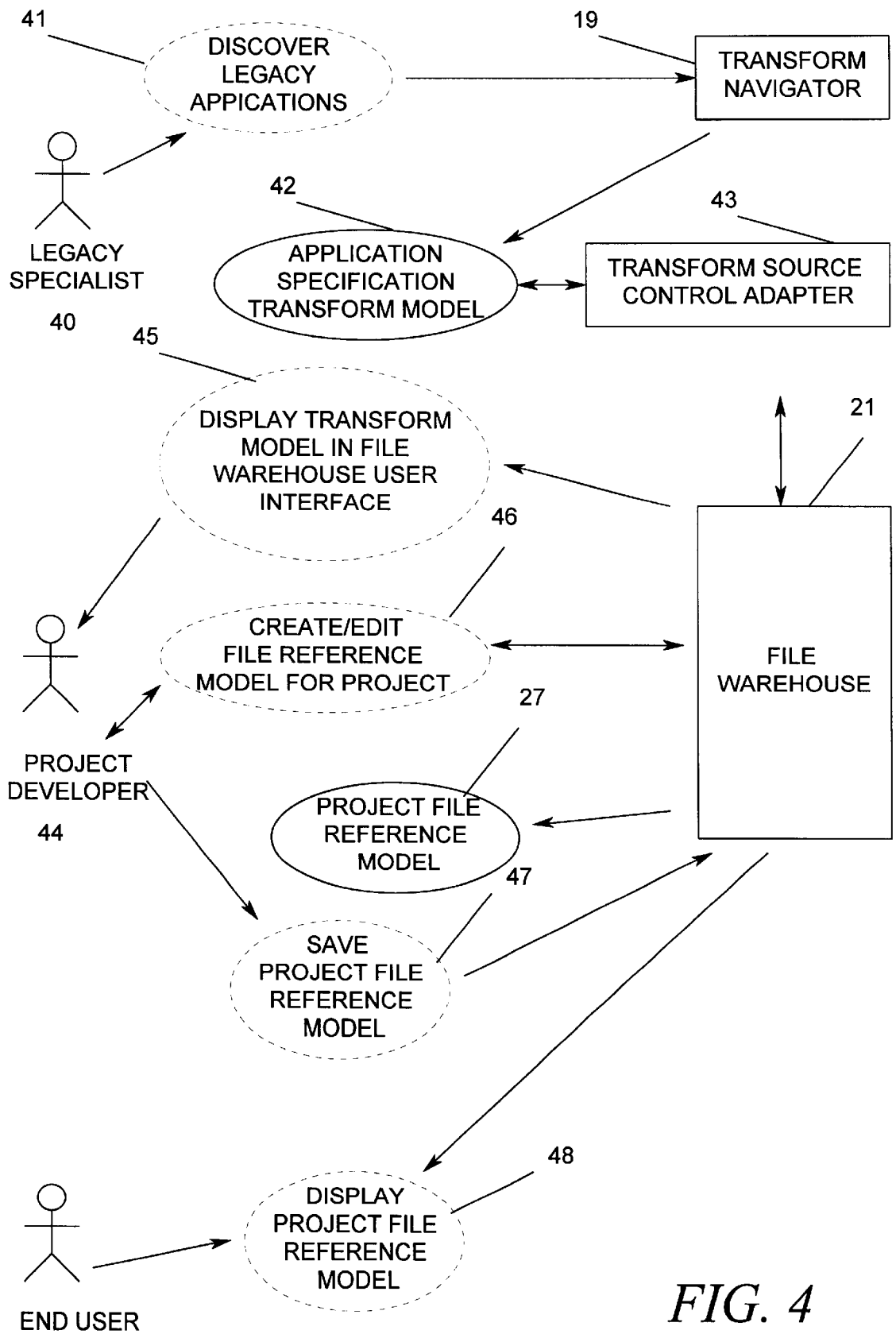
FIG. 4 is a use case diagram of the process of the present invention.

Referring now to FIG. 4, a use case diagram of the method for creating a file reference model of a project containing one or more screens of the legacy application is shown. The method begins when a legacy specialist 40 discovers 41 a legacy application 30 by use of the transform navigator 19. The result of the discovery operation 41 produces an application specification transform model 42 by use of the transform navigator 19. The file warehouse 21 responds to interaction by a project developer 44 for displaying 45 the transform model by extracting the application specifications via the transform source control adapter 43. The project developer 44 may create or edit the file reference model 27 for the project 46 or save it 47. Finally, the file warehouse 21 displays 48 the project file reference model for an end user 49 to view.

Figure 5A:
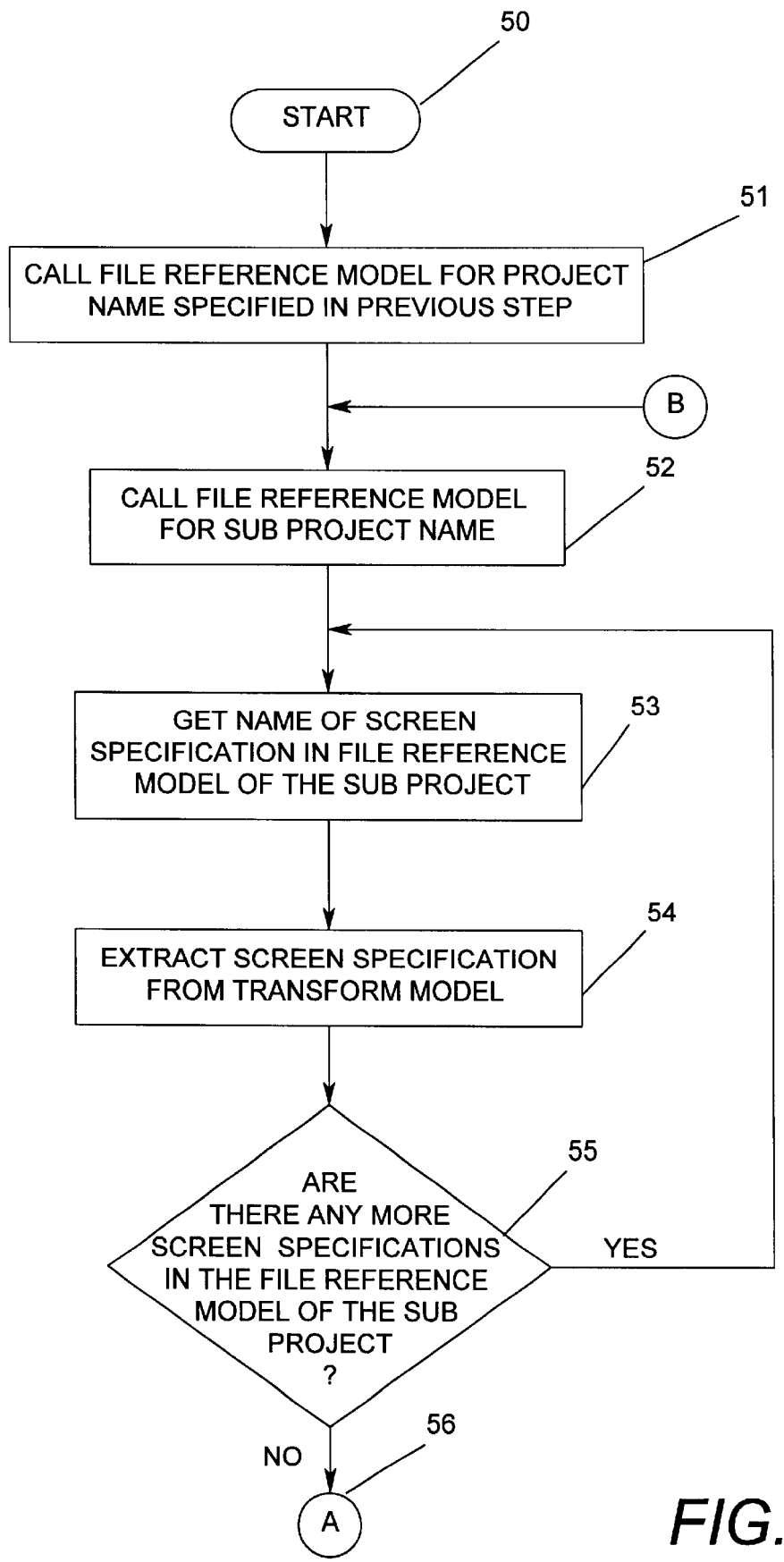
FIGS. 5A through 5C is a combined flow chart of the method for generating an UML/XML representation of the file reference model created by the method described with reference to FIG. 4 above.
Figure 5B:
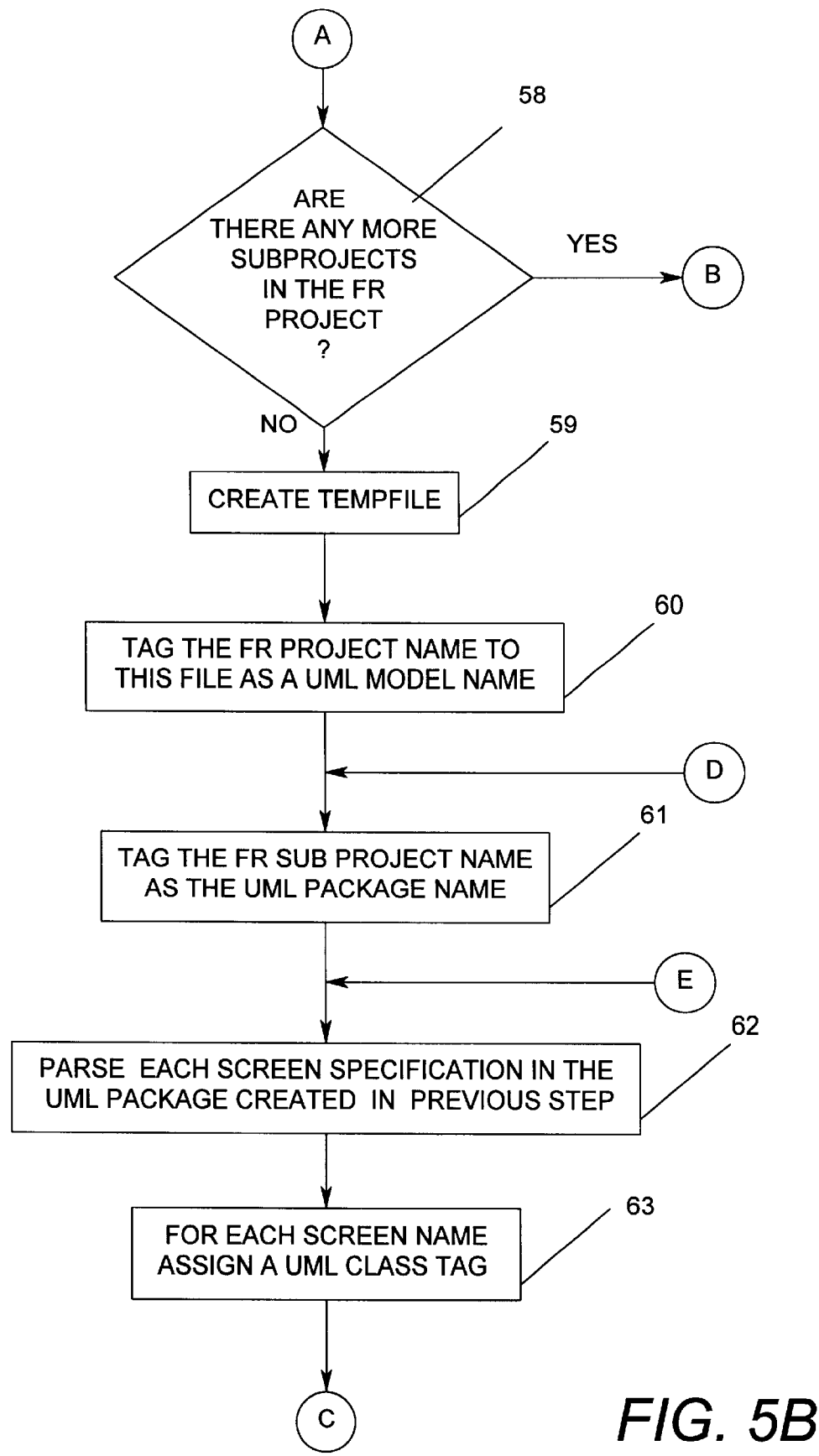
Figure 5C:
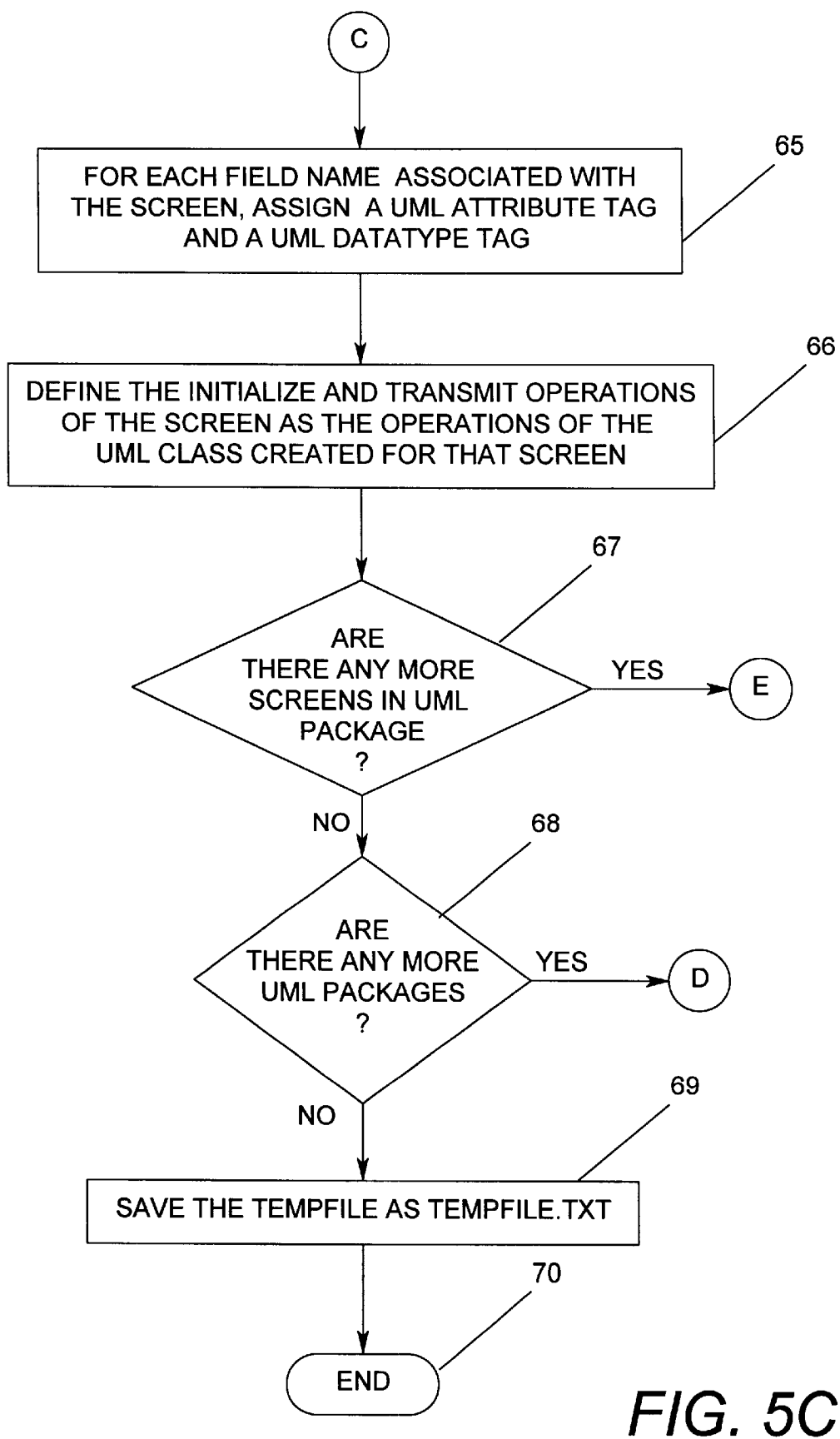

Referring now to FIGS. 5A through 5C, a combined flow chart of a method for generating a UML/XML representation of the file reference model created by the method described with reference to FIG. 4 above is shown. The method begins with a start bubble 50 followed by a step of calling a file reference model with the project name (block 51). This is followed by a step of calling (block 52) a file reference model with a sub-project name, where the sub-project is a part of the project called in the previous step. Next, a process (block 53) for getting the name of the screen specification in the file reference model of the sub-project is executed. Subsequently, a process (block 54) for extracting the screen specifications using the screen name determined in the previous step is executed. Next, an inquiry (block 55) is made to determine whether or not there are any more screen specifications in the file reference model of the sub-project. If the answer to this inquiry is yes, then a return is made back to the block 53. On the other hand, if the answer to this inquiry is no, then the process illustration continues in FIG. 5B as denoted by a connector A.

Referring now to FIG. 5B at the connector A, an inquiry is made as to whether or not there are any more sub-projects in the file reference model of the project (diamond 58). If the answer to this inquiry is yes, then a return is made back to the block 52 (FIG. 5A) as denoted by a connector B. On the other hand, if the answer to this inquiry is no, then a command to create a "tempfile" is executed (block 59). Next the project name of the file reference model is tagged to this tempfile as a UML model name (block 60). This step is followed by the step of tagging the file reference sub-model name as a UML package name to the tempfile (block 61). Next, each screen specification in the UML package created in the previous step is parsed (block 62). Subsequently for each screen name, a UML class tag is assigned (block 63). The process illustration continues as denoted by a connector C.

Referring now to FIG. 5C, at the connector C, a UML attribute and a UML datatype tag are assigned for each field name associated with the screen (block 65). Next, all the operations of the screen are initialized and transmitted as the operations of the UML class created for that screen (block 66). This is followed by making an inquiry whether or not there are any more screens in the UML package (block 67). If the answer to this enquiry is yes, then a return is make back to block 62 (FIG. 5B) as denoted by a connector E. If on the other hand, the answer to the above inquiry is no then a further inquiry is made to determine whether or not there are any more UML packages (block 68). If the answer to this inquiry is yes, then a return is made back to the block 61 (FIG. 5B) as denoted by a connector D. If on the other hand, the answer to the above inquiry is no, then a step of saving the tempfile as tempfile.txt is executed (block 69). After this, the process ends (bubble 70).

Figure 6:
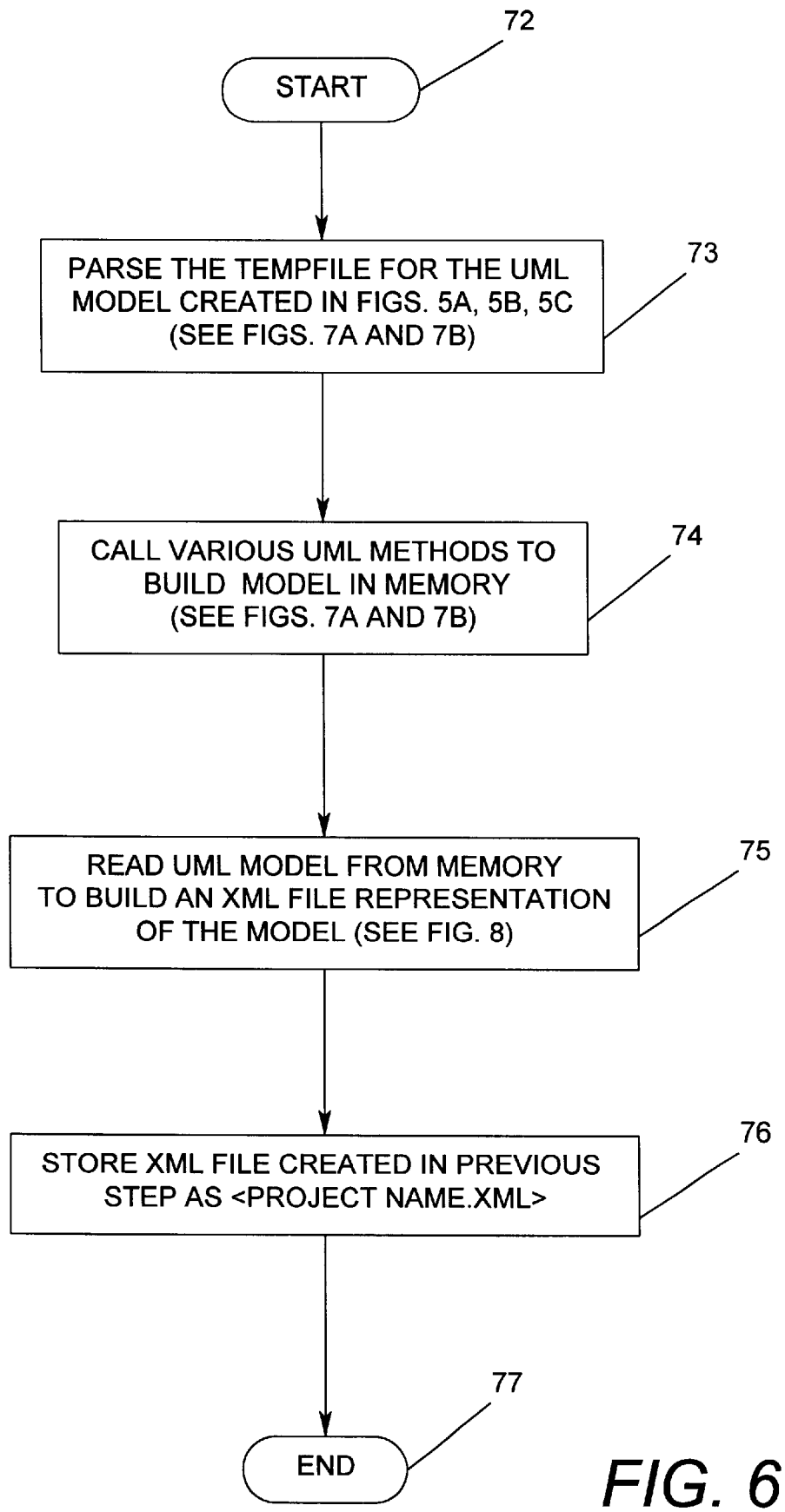
FIG. 6 is a flow chart depicting the process of generating an XML file representation of a UML model created by the process described in the process shown in FIGS. 5A through 5C.

Referring now to FIG. 6 where a flowchart depicting the process of generating an XML file representation of the UML model created by the process described in FIG. 5A through 5C. The process begins with a start bubble 72, followed by a process of parsing the tempfile (block 73) for the UML model created in FIGS. 5A, 5B and 5C. Next, a call 74 is made to the various UML methods to build a model in memory. This is followed by a step 75 of reading the UML model from memory, created in the previous step, and building an XML file representation of the model. Finally, the XML file representation created in the previous step is saved as <projectname.xml> (block 76) and the process ends (bubble 77).

Figure 7A:
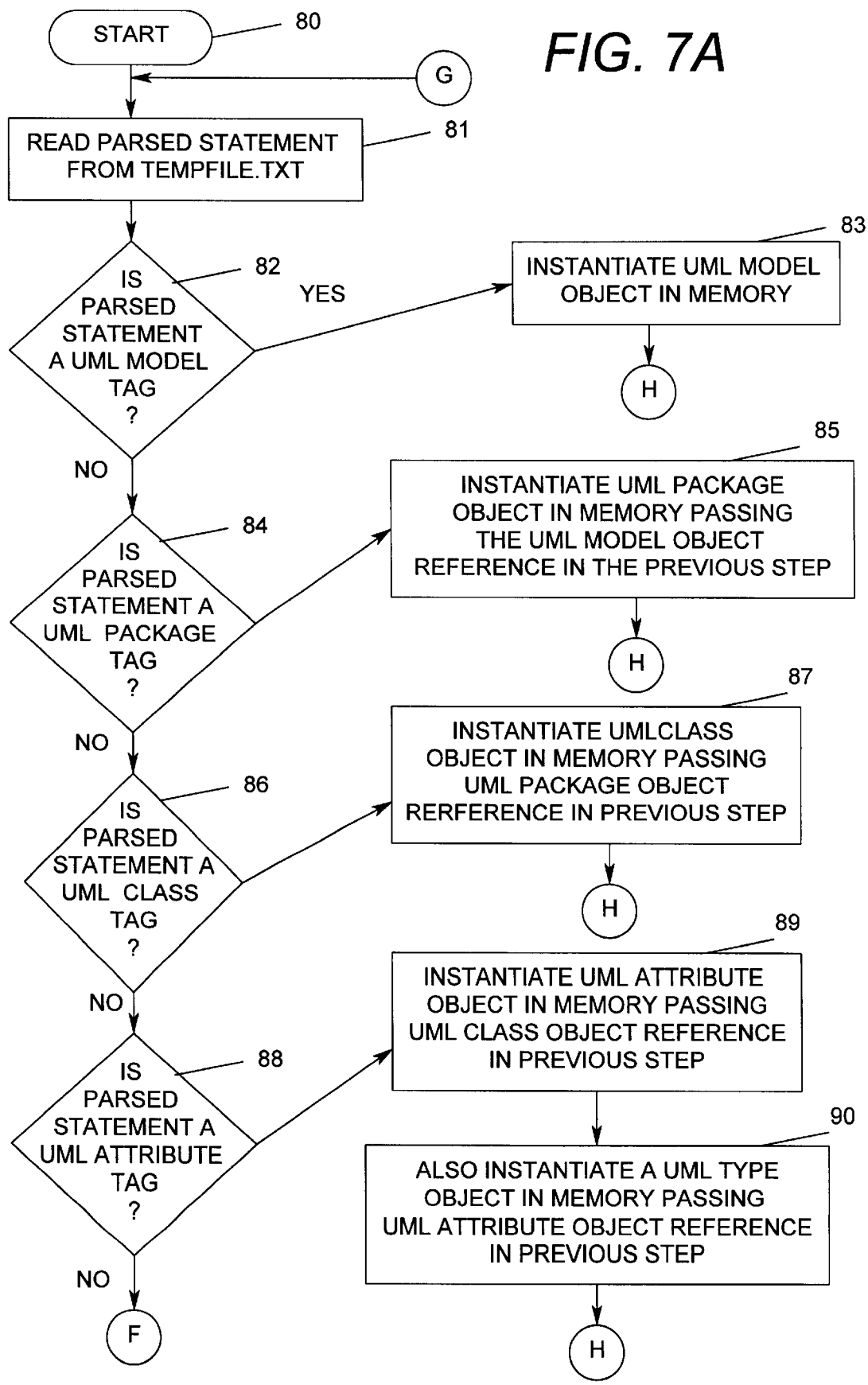
FIGS. 7A and 7B combined form a flow chart depicting the process of parsing a text file to generate an object-oriented representation of the UML model in memory.

Referring now to FIG. 7A, a flowchart for the process of parsing a text file to generate an object-oriented representation of the UML model in memory is shown. The process begins with a start bubble 80, followed by a step 81 of reading a parsed statement from the file tempfile.txt created in the step depicted by the block 69 (FIG. 5C). Next, an inquiry 82 is made to determine whether or not the parsed statement is an UML Model tag. If the answer to this inquiry is yes, then an UML model object is instantiated in the memory (block 83) and the process illustration continues in FIG. 7B at a connector H.

On the other hand, if the answer to the inquiry in the diamond 83 is no, then an inquiry 84 is made to determine whether or not the parsed statement is an UML package tag. If the answer to this inquiry is yes, then an UML package object is instantiated (block 85) in memory by passing the UML Model Object reference created in the block 83 and the process continues in FIG. 7B at the connector H. On the other hand, if the answer to the above inquiry is no, then an inquiry (diamond 86) is made to determine whether or not the statement is an UML class tag.

Figure 7B:
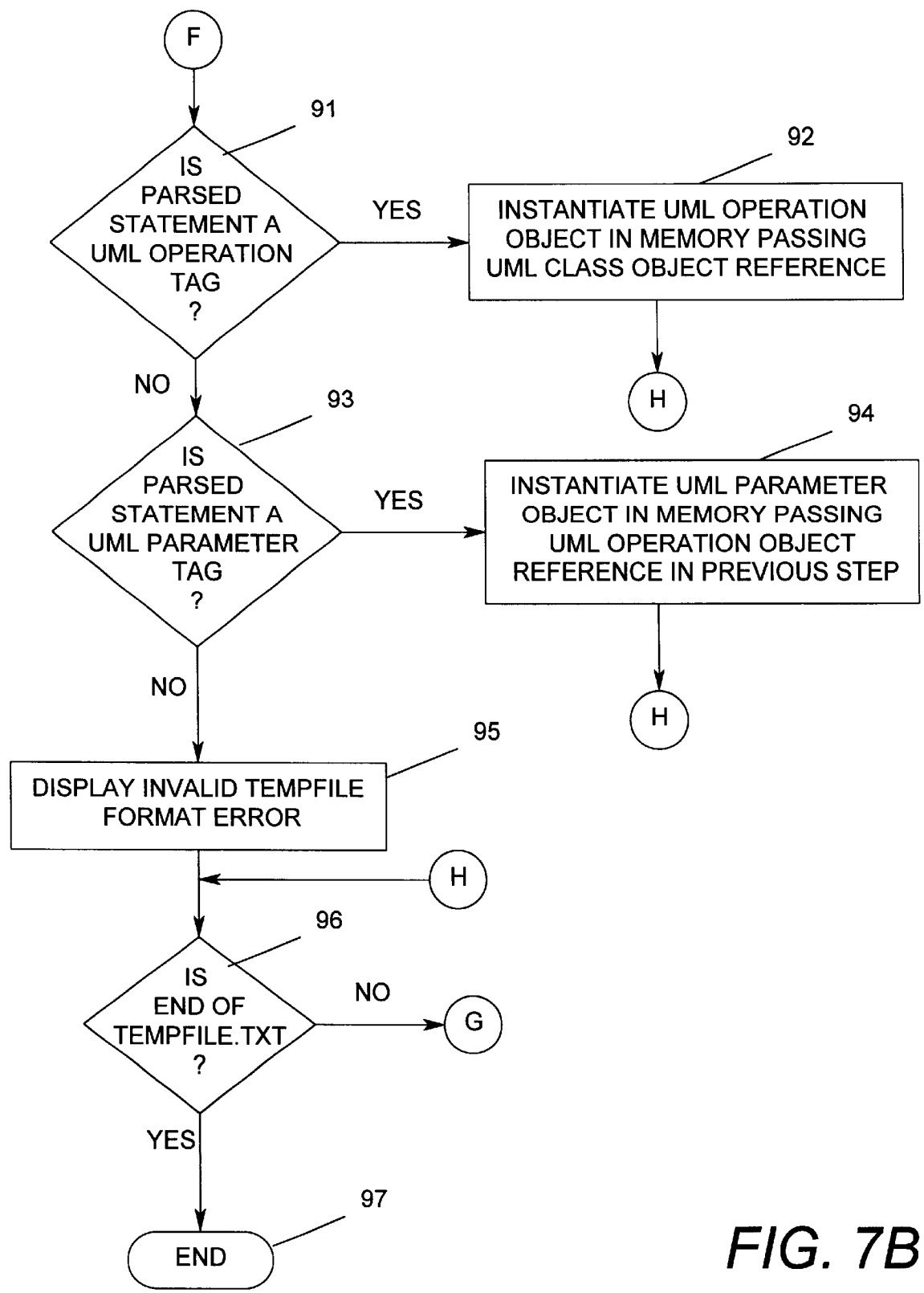

If the answer to the inquiry in the diamond 86 is yes, then an UML Class object is instantiated in memory (block 87) by passing the UML Package object reference created in the step depicted by the block 85 and the process continues in FIG. 7B at the connector H. On the other hand, if the answer to this inquiry is no, then an inquiry 88 is made to determine whether or not the parsed statement is an UML Attribute tag. If the answer to this inquiry is yes, then an UML attribute object is instantiated in memory (block 89) by passing the object reference of the UML Class object created in the step depicted by the block 87. Following this, an UML type reference object is instantiated in memory (block 90) by passing the object reference of the UML attribute object created in the process step depicted by the block 89. On the other hand, if the answer to this inquiry is no, then the process illustration continues in FIG. 7B as shown by a connector F.

Referring now to FIG. 7B, the process continues at the connector F wherein an inquiry (diamond 91) is made to determine whether or not the parsed statement is a UML operation tag. If the answer to the this inquiry is yes, then an UML operation object is instantiated in memory (block 92) by passing the UML class Object reference created in the step depicted by the block 89 (FIG. 7A), and the process continues as shown by the connector H. On the other hand, if the answer to this inquiry is no, then another inquiry (diamond 93) is made to determine whether or not the parsed statement is an UML parameter tag.

If the answer to the inquiry in the diamond 93 is yes, then an UML parameter object is instantiated in memory (block 94) by passing the UML operation object reference created in the step depicted by the block 92 and the process continues as shown by the connector H. On the other hand, if the answer to this inquiry is no, then an invalid tempfile format error is displayed (block 95). Following this, and also continuing from the connector H, an inquiry (diamond 96) is made to determine whether or not the end of the tempfile has been reached. If the answer to this inquiry is no, then the process continues via a connector G back to the block 81 (FIG. 7A) for execute the process anew. On the other hand, if the answer to this inquiry is yes then the process ends in bubble 97.

Figure 8:
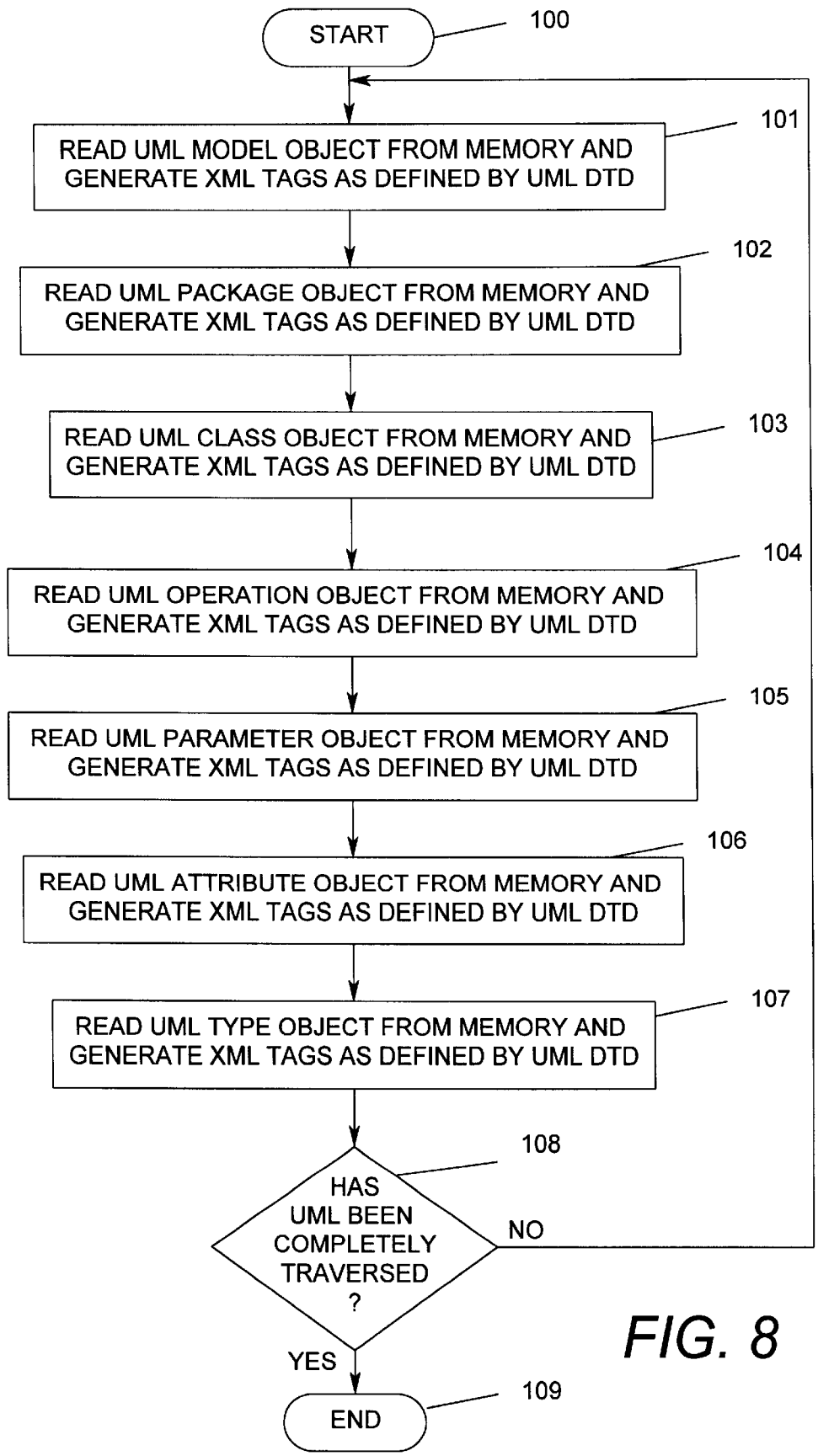
FIG. 8 is a flowchart depicting the process of reading a UML model from memory and building an XML file representation of that model.

Referring now to FIG. 8, wherein is shown a flowchart depicting the process of reading a UML model from memory and building an XML file representation of the model. The process begins with a start bubble 100, followed by a step 101 of reading an UML model object from memory and generating an XML tag as defined by the UML DTD. Following this, a step 102 of reading an UML package object from memory and generating an XML tag as defined by the UML DTD is executed. Next, a step 103 of reading an UML class object from memory and generating an XML tag as defined by the UML DTD is executed. Next, a step 104 of reading an UML operation object from memory and generating an XML tag as defined by the UML DTD is executed.

Following the above, a step 105 of reading an UML parameter object from memory and generating an XML tag as defined by the UML DTD is executed. Next, a step 106 of reading an UML attribute object from memory and generating an XML tag as defined by the UML DTD is executed. After this, a step 107 of reading an UML type object from memory and generating an XML tag as defined by the UML DTD is executed. Following this, an inquiry is made to determine whether or not the UML model has been completely traversed. If the answer to this inquiry is no, the process repeats itself starting from block 101. On the other hand, if the answer this inquiry is no then the process ends (bubble 109).

Referring now to FIG. 9, a diagram illustrating a user interface for the terminal to XML converter tool of the present invention is shown. A UML model shown by the block 110 can be seen in several available view forms through this user interface. These could be a use case view (block 111), a logical view (block 112), a component view (block 116) or a deployment view (block 117). The logical view 112 is shown expanded in FIG. 9 and comprises two UML packages, Transform Credit 113 and Transform Debit 114. These packages represent legacy terminal based applications that are the subject of the present invention. The UML package Transform Credit comprises a set of classes shown by a bracket 115. These classes are shown within the bracket by blocks 116A through 116J. A class diagram corresponding to these classes is shown by expanding a block 117 in the class diagram section of the user interface. Similarly, the UML package Transform Debit comprises a set of classes shown by blocks 119A through 119B within the bracket 118. These classes can be viewed in the class diagram section by expanding a block 120.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer-implemented method for automatically converting text-based screen applications of a legacy computer system into a graphical-based representation thereof, said method comprising the steps of:
   a. transforming a terminal-based screen application into an application specification;
   b. converting said application specification into a modeling language-based representation, said converting further including the steps of:
      b-1. extracting a screen specification corresponding to a file reference model thereof stored in a repository;
      b-2. parsing said screen specification into classes, attributes and packages thereof;
      b-3. defining operations for said classes corresponding to operations of said screen specification; and,
      b-4. establishing for each field name within said screen specification a corresponding relationship among said classes; and
   c. displaying said modeling language-based representation with a graphical user interface.

2. A method as in claim 1 further including the step of generating document type definitions of said modeling language-based representation for facilitating transmission of said representation among modeling tools.

3. A method as in claim 1 and in response to a user's selection of specific references within one of said terminal-based screen applications, further including the step of creating a project file containing said specific references.

4. A method as in claim 3 wherein said step of transforming further includes the steps of discovering applications within said legacy computer system by using a transform navigator and storing said discovered application in a repository.

5. A method as in claim 4 further including the step of creating application specifications of said discovered legacy applications.

6. A method as in claim 5 further including the step of diplaying one of said application specifications of one of said discovered applications in a file warehouse interface.

7. A method as in claim 6 and in response to a user's selection of a specific application specification, further including the step of creating a file reference model thereof.

8. A method as in claim 6 and in response to a user's selection of a specific application specification, further including the step of displaying a file reference model thereof.

9. A method as in claim 6 and in response to a user's selection of a specific application specification, further including the step of saving a file reference model thereof.

10. The method as in claim 1 further including the step of saving said modeling language-based representation in a repository.

11. The method as in claim 1 wherein said graphical-based representation is the Universal Modeling Language.

12. The method as in claim 1 wherein said modeling language-based representation is the eXtended Mark-up Language.

13. A program storage device readable by a machine, tangibly embodying a program of instructions executable by the machine to perform method steps for automatically converting text-based screen applications of a legacy outer system into a graphical-based representation thereof, said method steps comprising;
   a. transforming a terminal-based screen application into an application specification;
   b. converting said application specification into a modeling language-based representation, said converting further including the steps of:
      b-1. extracting a screen specification corresponding to a file reference model thereof stored in a repository;
      b-2. parsing said screen specification into classes, attributes and packages thereof;
      b-3. defining operations for said classes corresponding to operations of said screen specification; and,
      b-4. establishing for each field name within said screen specification a corresponding relationship among said classes; and
   c. displaying said modeling language-based representation with a graphical user interface.

14. The storage device as in claim 13 further including the step of generating document type definitions of said modeling language-based representation for facilitating transmission of said representation among modeling tools.

15. The storage device as in claim 13 and in response to a user's selection of specific references within one of said terminal-based screen applications, further including the step of creating a project file containing said specific references.

16. The storage device as in claim 15 wherein said step of transforming further includes the steps of discovering applications within said legacy computer system by using a transform navigator and storing said discovered application in a repository.

17. The storage device as in claim 16 further including the step of creating application specifications of said discovered legacy applications.

18. The storage device as in claim 17 further including the step of displaying one of said application specifications of one of said discovered applications in a file warehouse interface.

19. The storage device as in claim 18 and in response to a user's selection of a specific application specification, further including the step of creating a file reference model thereof.

20. The storage device as in claim 18 and in response to a user's selection of a specific application specification, further including the step of displaying a file reference model thereof.

21. The storage device as in claim 18 and in response to a user's selection of a specific application specification, further including the step of saving a file reference model thereof.

22. The storage device as in claim 13 further including the step of saving said modeling language-based representation in a repository.

23. The storage device as in claim 13 wherein said graphical based representation is the Universal Modeling Language.

24. The storage device as in claim 13 wherein said modeling language based representation is the Extended Mark-up Language.

* * * * *